Patented Jan. 12, 1926.

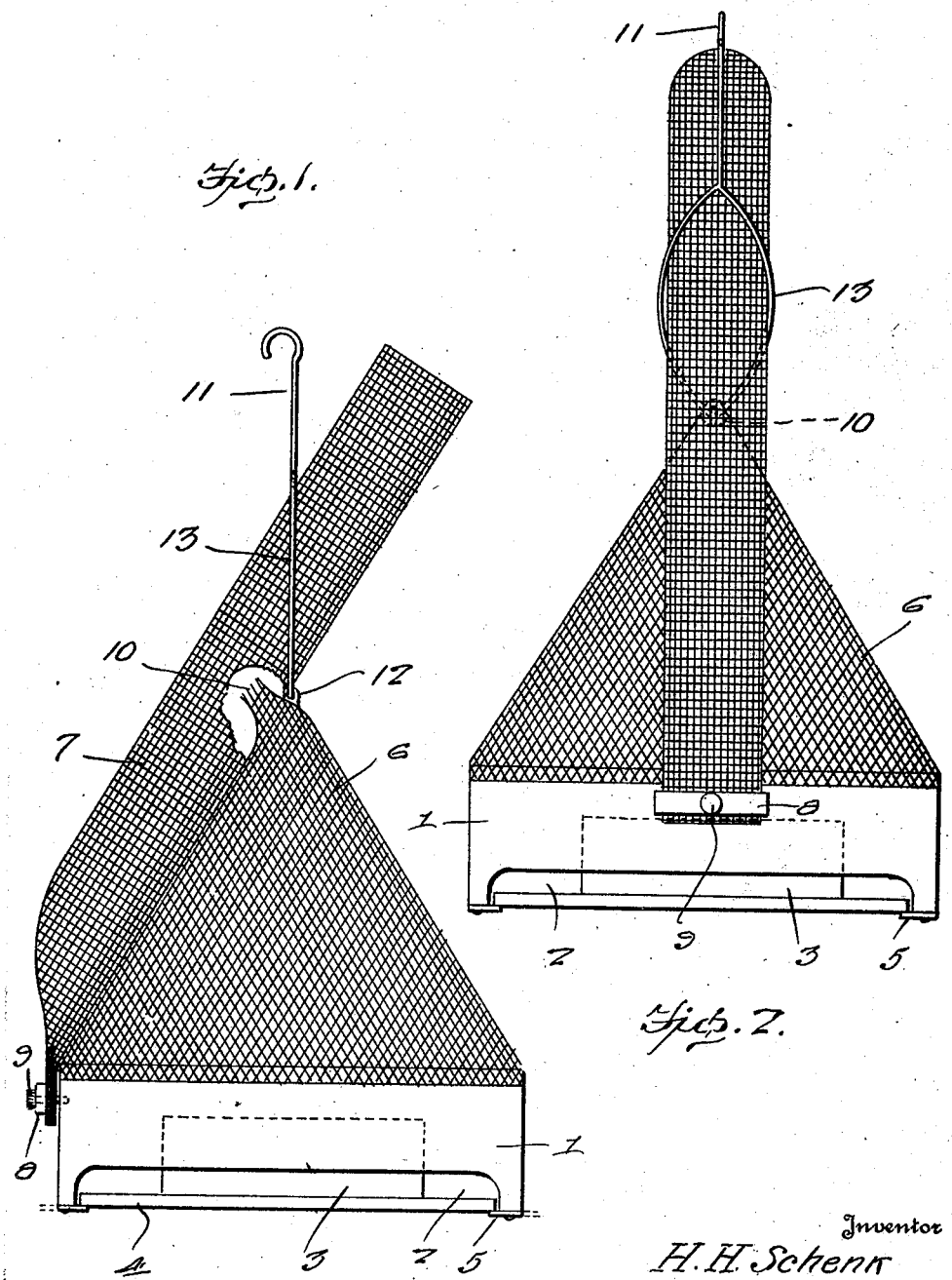

1,569,681

UNITED STATES PATENT OFFICE.

HENRY H. SCHENK, OF MEMPHIS, MISSOURI.

FLYTRAP.

Application filed March 23, 1925. Serial No. 17,711.

*To all whom it may concern:*

Be it known that I, HENRY H. SCHENK, a citizen of the United States, residing at Memphis, in the county of Scotland and State of Missouri, have invented certain new and useful Improvements in a Flytrap, of which the following is a specification.

This invention relates to improvements in fly traps and has for its principal object to provide a simple and efficient device which will promote sanitation and may be readily placed wherever desirable.

One of the important objects of the present invention is to provide a fly trap which may be readily collapsed when not in use so as to occupy a minimum amount of space when stored away, the device being readily set up in position for use.

A further object is to provide a fly trap of the above mentioned character which includes a means for entrapping flies so that the insects cannot escape, means being further provided for permitting the dead insects to be readily removed from the trap.

A further object is to provide a fly trap of the above mentioned character, which is simple in construction, inexpensive, strong and durable and further well adapted for the purpose for which it is designed.

Other objects and advantages of this invention will become apparent during the course of the following description taken in connection with the accompanying drawing.

In the accompanying drawing forming a part of this specification, and in which like numerals designate like parts throughout the same:

Figure 1 is a side elevation of the fly trap embodying my invention, and

Figure 2 is a front elevation thereof.

In the drawing, wherein for the purpose of illustration is shown the preferred embodiment of my invention, the numeral 1 designates generally the base section of my improved fly trap, the same being formed of any suitable opaque material and is substantially in the form of a circular band or frame. The lower portion of the base section is cut away as illustrated at 2 to provide an entrance for the flies to the bait which is placed in the bait holder 3, the latter being supported on a suitable platform 4. This platform is removably supported within the lower portion of the base section 1 by the catches 5 in the manner clearly illustrated in the drawing. The catches are of such a nature as to permit the platform and the bait holder to be readily removed from within the base section whenever it is necessary.

A substantially conical shaped chamber 6 which is formed of fine wire mesh extends upwardly from the base section, the lower portion of the chamber being secured to the upper portion of the base section in any suitable manner.

Extending upwardly along the outer face of the substantially conical shaped chamber 6 and attached thereto in any suitable manner is the fly entrapping chamber 7. The latter is substantially cylindrical in design, and the upper portion thereof extends upwardly beyond the apex of the conical shaped chamber 6 as is clearly illustrated in the drawing. The cylindrical fly entrapping compartment 7 is also formed of fine wire mesh, the upper end thereof being closed. The lower end of the cylindrical fly entrapping compartment 7 is open, but the open lower end of the compartment is normally closed by forcing the lower portion of the fine wire mesh which forms the compartment together and fastening the lower portion together by means of a detachable clamp 8 and the screw 9 as is more clearly illustrated in the drawing. The lower end of the compartment 7 terminates at a point adjacent the base section 1.

The chamber 6 is provided with a fly exit 10 at a point adjacent the apex thereof and the exit extends into the intermediate portion of the compartment 7 so that the compartment will have communication with the chamber. The strands of wire of the fly exit 10 are arranged so as to prevent any possibility of a fly returning to the chamber 6 after having once entered the compartment 7.

A suspension hook designated generally by the numeral 11 has its lower end secured to the conical shaped chamber 6 as illustrated at 12, the hook 11 being provided with the compartment encircling portion 13 as is more clearly illustrated in Figure 2. The hook 11 provides a means whereby the fly trap may be suspended from any suitable support as may be desired.

In use, the insects will enter the base section 1 through the entrance 2 so that access to the bait in the holder 3 may be had. The insects will of course be attracted by the light and will enter the chamber 6. The flies will leave the chamber 6 through the exit 10 and will enter the compartment 7 where the same will become entrapped. In order to remove the dead insects which collect in the bottom of the cylindrical compartment 7, the clamp 8 is removed from the open lower end of the compartment and the lower portion of the compartment is spread apart so as to enable a person to remove the dead insects therefrom. By closing the lower open end of the compartment, the trap is again ready for use.

A fly trap of the above mentioned character will at all times be positive and efficient in carrying out the purposes for which it is designated, and will furthermore promote sanitation. By removing the platform and bait holder from the base section, the fly trap may be collapsed by folding the same along its medial center so as not to occupy any considerable amount of space when stored away.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

A fly trap comprising an opaque base section provided with a fly entrance, a bait holder removably supported within the base section, a substantially conical shaped wire mesh chamber having its larger end secured to the upper portion of the base section and communicating therewith, a substantially cylindrical shaped fly entrapping compartment formed of wire mesh extending upwardly along the outer face of the conical chamber, the upper portion of said fly entrapping compartment extending above the apex of the conical shaped chamber, said chamber being provided with a fly exit which extends into the intermediate portion of the fly entrapping compartment, the upper end of the compartment being closed, the lower end thereof being open, means for normally closing the open lower end of said compartment, and a suspension hook for said trap, said lower end of said hook being attached to the upper portion of said chamber and said hook being provided with a compartment encircling portion.

In testimony whereof I affix my signature.

HENRY H. SCHENK.